(12) United States Patent
Claudel et al.

(10) Patent No.: US 9,295,911 B2
(45) Date of Patent: Mar. 29, 2016

(54) ELECTRONIC BALANCING PLATFORM WITH REMOVABLE LEGS

(75) Inventors: Frédéric Claudel, Paris (FR); Frédéric Nicolas, Moret-sur-Loing (FR)

(73) Assignee: Bigben Interactive SA, Lesquin (FR)

( * ) Notice: Subject to any disclaimer, the term of this patent is extended or adjusted under 35 U.S.C. 154(b) by 158 days.

(21) Appl. No.: 13/824,090

(22) PCT Filed: Sep. 16, 2011

(86) PCT No.: PCT/EP2011/066158
§ 371 (c)(1),
(2), (4) Date: Sep. 9, 2013

(87) PCT Pub. No.: WO2012/035161
PCT Pub. Date: Mar. 22, 2012

(65) Prior Publication Data
US 2013/0344926 A1 Dec. 26, 2013

(30) Foreign Application Priority Data
Sep. 16, 2010 (FR) ...................................... 10 03692

(51) Int. Cl.
*A63F 9/24* (2006.01)
*A63F 13/00* (2014.01)
*A63B 22/16* (2006.01)
*A63B 23/04* (2006.01)
*G06F 3/01* (2006.01)

(52) U.S. Cl.
CPC ............. *A63F 13/005* (2013.01); *A63B 22/16* (2013.01); *A63B 23/0458* (2013.01); *G06F 3/011* (2013.01); *A63B 2220/18* (2013.01); *A63B 2220/40* (2013.01)

(58) Field of Classification Search
CPC .. A63B 26/003; A63B 2220/18; A63B 22/16; A63C 5/03; G06F 3/011; A63F 13/005
See application file for complete search history.

(56) References Cited

U.S. PATENT DOCUMENTS

| 5,314,391 | A | 5/1994 | Potash et al. | |
|---|---|---|---|---|
| 5,613,690 | A * | 3/1997 | McShane et al. | 273/449 |
| 6,106,397 | A | 8/2000 | Phillips | |
| 6,705,977 | B1 * | 3/2004 | Ziak | 482/146 |
| 2003/0109365 | A1 * | 6/2003 | Smith | 482/146 |
| 2004/0242390 | A1 | 12/2004 | Willliams | |
| 2005/0221895 | A1 * | 10/2005 | Lum et al. | 463/39 |
| 2007/0027010 | A1 * | 2/2007 | Tsai | 482/146 |
| 2008/0004111 | A1 | 1/2008 | Prather et al. | |
| 2008/0261696 | A1 | 10/2008 | Yamazaki et al. | |
| 2009/0093315 | A1 | 4/2009 | Matsunaga et al. | |
| 2010/0216551 | A1 * | 8/2010 | Dwyer et al. | 463/36 |

FOREIGN PATENT DOCUMENTS

| DE | 202 13 691 U1 | 1/2003 |
|---|---|---|
| EP | 1 691 897 | 8/2006 |
| WO | WO 2005/056122 | 6/2005 |

* cited by examiner

*Primary Examiner* — Steve Rowland
(74) *Attorney, Agent, or Firm* — Patterson Thuente Pedersen, P.A.

(57) ABSTRACT

A device for the interactive practice of gymnastics in association with an image and sound system constituting the gymnastics program to be followed by a user. The device includes a platform, a sensor system housed in the platform making it possible to detect the position of the obstacles around the platform, and a connecting system sending the signals coming from the platform sensors to a digital processing unit.

13 Claims, 3 Drawing Sheets

ELECTRONIC BALANCING PLATFORM WITH REMOVABLE LEGS

RELATED APPLICATIONS

The present application is a National Phase entry of PCT Application No. PCT/EP2011/066158, filed Sep. 16, 2011, which claims priority from FR Application No. 10/03692, filed Sep. 16, 2010, the disclosures of which are hereby incorporated by reference herein in their entirety.

TECHNICAL FIELD

The present invention relates to the field of interactive devices for video games, used in association with image and sound systems such as a television connected to a player station or a digital processing unit. The present invention more particularly relates to an interactive gymnastic device.

BACKGROUND OF THE INVENTION

It is already known from the prior art the use of video game peripheral devices for increasing playful and sports interactions, rendering the practice of video games more realistic. Thus, there has been a development of platforms and interactive balance boards.

U.S. Patent Application Publication No. 2008/261696 describes an interactive platform able to detect the weight of a user as well as evaluate, from the distribution of this weight on its different pressure sensors, the center of gravity of the user, and send these signals to a game console which then retranscribes them in a video game. This device cannot however, inform of the user position when the latter is not on the platform, thus, limiting the sports and playful applications. On the other hand, the platform is steady and does not oscillate, rendering it unusable in its present state as a balance platform. Could it be usable, by adding an accessory under its lower side for example, it does not have the type of sensors which make it possible to detect the angular variations to which it is subjected to with a high enough resolution and hence to retranscribe them adequately in a program or video game.

Document EP1691897 describes a platform surrounded with a mat that is sensitive to pressure. Such a device makes it possible to know the position of a user when he/she is on the platform and when he/she is around it within the limits of said mat. However, the use, in a gymnastics setting, of a pressure-sensitive mat presents drawbacks. In fact, the mat may during sports practice, fold over and thus become both imprecise in terms of positioning of the user and cause him/her to fall. On the other hand, the positioning of the user is determined with respect to the activation of predefined areas on the mat: these areas hence cannot be adapted in real time by the game software according to the type of exercise carried out. Furthermore, the positioning precision of the user increases according to the number of areas on the mat, and hence the manufacturing complexity of the device as well as its cost. On the other hand, the use of the device requires that the user has at least, in front of his/her television set, a vacant surface equal to that of the mat, which may not always be the case. Finally, from a commercial viewpoint, current trends privilege compact objects of reduced size, however, the mat will make the assembly seem large.

U.S. Pat. No. 5,613,690 describes a balance board comprised of an upper portion having a convex lower surface, resting on a base, such that the angular variations of the balance board, on which the user stands, are detected and retransmitted to a digital processing unit. Such a balance board cannot however indicate the position of the user if the latter is not on the board, nor can it indicate the weight of the user.

U.S. Pat. No. 6,106,397 describes a device provided with a positioning means which detects when the user moves away from the defined area, indicated as generally being a vertical axis, located on the platform. Similarly, U.S. Patent Application Publication No. 2004/242390 describes a device constituted of a concave surface on which the user stands, and such that the position of the user on said surface is known. The positioning means described do not detect the position of the feet of the user around the device, which constitutes essential information for controlling gymnastic choreographies with platform.

U.S. Pat. No. 5,314,391 describes a running mat provided with a device making it possible to detect the distance of the user located on the mat, with respect to the front and back of the apparatus, and adjust the travelling speed of the mat accordingly. Such a device makes it possible to know certain positions of the user when he/she is on the device, but not around it, and even less the positioning of the feet of the user around the device.

It generally appears that no document from the prior art provides an interactive device, of platform-type for gymnastic applications which make it possible for use as a reference accessory for practicing interactive gymnastics on and around the platform.

SUMMARY OF THE INVENTION

Embodiments of the present invention are directed to remedy the drawbacks of the prior art for gymnastic applications using a platform. To this end, a main, non-limiting, purpose of the invention is to constitute an interactive playful and sports peripheral device for digital processing unit such as for example video game consoles, computers or video game arcade cabinets, making it possible to carry out interactive gymnastic sessions using a platform, such that the positions of the user around and on the platform are detected by the device particularly such as to propose and monitor the good realization of movement choreography around and on the platform.

To this end, embodiments of the present invention relate to a device for the interactive practice of gymnastics in association with a digital processing unit running a gymnastics program to be followed by a user, comprising a platform provided with a sensor system and means for transmitting signals coming from the sensors to the digital processing unit, characterized in that the sensor system of the platform is adapted to detect the position of obstacles around said platform.

Particularly, such a device can be used for interactive gymnastic sessions using a platform, in that the system for positioning obstacles around the platform may be used to position the feet of the user when they are around the platform, and hence considered as obstacles, and the connecting system will be able to send this information to the program so that the latter takes it into account.

The device according to an embodiment comprises a platform.

According to a particular embodiment, this platform comprises a flat upper portion.

According to a particular embodiment, the upper portion of the device is parallel with the ground if the platform is placed on a flat surface.

According to an embodiment, the platform comprises at least one pressure sensor. Such a sensor can be activated when the user is on the platform. This sensor can send a "bang-bang control" or analog signal depending on the weight exerted on the platform.

Such a "bang-bang control" sensor can, for example, be constituted by a pressure sensitive surface. Such a surface generally comprises two flat conductive strata separated by a foam type material wherein several orifices of sufficient diameters have been created. At rest, when no external pressure is exerted on the pressure sensitive surface, the expansion force of the foam type material maintains the two conductive strata separated and opens the electric circuit of which the latter are ends. When a pressure is exerted that is higher than the expansion force of the foam type material, the two conductive strata join and are in contact through the orifices of the foam type material, thus closing the electric circuit whereof the conductive strata are the ends.

According to an embodiment, the upper surface of the platform is a pressure sensitive surface.

According to a particular embodiment, this platform comprises legs.

According to a particular embodiment, the device comprises members that can be combined with the legs of the platform such as to make it vary in height.

According to a particular embodiment, each of these legs is associated with a pressure sensor detecting the pressure exerted by the platform on said leg.

According to an embodiment, the pressure sensors are located in the housings of the legs located in the platform. Such a system can, for example, be constituted of a flexible bar located at the bottom of the housing of the leg and which rests on the leg when the latter is connected to the platform. A sensor arranged on the bar thus makes it possible to assess the curvature of the flexible bar due to the reaction force of the leg regarding the weight exerted by the user when he/she is on the platform, and deduce an analog measurement of the weight according to a calibration of the platform and bending characteristics, supposedly known, of the flexible bar.

According to an embodiment, the pressure sensors are located in the legs and the signals coming from said sensors are transmitted to the platform by means of electric connections between the legs and the platform.

According to a particular embodiment with pressure sensors, the pressure is detected in an analog manner, thus making it possible to deduce, by studying the different pressures indicated by the sensors, the projection of the center of gravity of the user on the upper surface of the platform. Thus, if the platform is rectangular and that the legs—and their sensors—are four, arranged at the four corners of the platform, this projection may be defined as the intersection of the medians of the triangle determined by the weighted mid-points of the three segments coming from the sensor detecting the most pressure towards the three other sensors.

A second aspect of the embodiments is to constitute a playful and sporty interactive peripheral device making it possible for the user to do interactive exercises allowing him/her to improve his/her balance, such as to complete, with one and the same device, gymnastic exercises of the main aspect of the invention.

To this end, according to a particular embodiment, the lower surface of the platform is convex and the legs of the platform are removable. Thus, once the legs removed, the platform becomes a balance platform. According to this embodiment, the lower shape is convex mainly at its periphery, with a flat surface at its center equivalent to around ⅔ of the upper surface of the platform, so that the device is relatively stable, even though it can sway and roll. It is worth noting that the embodiment with removable legs is compatible with the aforementioned embodiments with pressure sensors located in the legs or in the housing of the legs.

In the particular embodiment incorporating removable legs, legs of different heights will be provided with the device so as to be able to make the height of the platform vary and hence the difficulty of the gymnastic exercises.

According to a particular embodiment incorporating removable legs, the platform comprises angle sensors. These sensors provide the platform angular inclination values when the latter is used as a balance board. These angle sensors can be constituted of one or several gyroscopes or by several accelerometers or by a combination of these sensors. According to an embodiment with accelerometers, three accelerometers will be arranged orthogonally with the axes of two accelerometers in the plane of the upper surface of the platform such as to detect, in the coordinate system of the accelerometers, the components of the acceleration vector of the terrestrial gravity and deduce an inclination of the platform with respect to the latter, supposing that the acceleration of gravity is vertical.

According to an embodiment with a balance board, the projection of the center of gravity of the user on the upper surface of the platform may be estimated by the inclination of the balance board such as evaluated by the device according to embodiments of the invention. The Cartesian coordinates of this projection on the upper surface of the platform correspond for each of the coordinates to the ratio of the angle of inclination on the maximum angle multiplied by the half-length of the platform.

The device comprises a system housed in the platform, detecting the position of obstacles around the platform. This system will particularly serve to evaluate the position of the feet of the user when they are around the platform.

According to an embodiment, the system for positioning the obstacles comprises a calibrating phase where the user stands on the platform, and during which the system for positioning obstacles around the platform establishes then memorizes a topology of the obstacles which are not constituted by the feet of the player. Thus, a signal which has been reflected while not having reached the distance separating the platform from the nearest obstacle counted in the topology of this area during the calibrating phase, will be considered as representing a "user foot" in an area monitored by the positioning system. According to this embodiment, the "user having two feet on the platform" could be considered representing the fact that no other obstacle, other than those counted during the calibrating phase, is detected by the obstacle positioning system. Such a positioning system hence makes it possible to know whether the feet of the user are around and/or on the platform.

According to a particular embodiment, the positioning system is constituted by a system of range-finders located in the platform and directed outwards from the rim thereto, such that the space covered by the range-finder system is the space portion comprised on the one hand between the plane constituted by the ground and on the other hand the plane passing via the upper portion of the platform, even above it, excluding the volume constituted by the platform itself.

According to possible embodiments, such range-finders are constituted of ultrasound range-finders, infrared range-finders or radio range-finders or a combination of these. The most common operating principle of a range-finder consists in a source that emits a signal sent towards an area to be monitored. When the signal comes across an obstacle, the signal is reflected and is sent to the area of the source where it is recovered by an adequate sensor generally located near the signal source. In the case of an infrared range-finder, the source is an infrared transmitter that is generally emitted in the form of a short pulsation, and the receptor is composed of one or several photoconductive cells. The signal received is generally increased in order to be used. The distance between the source and the obstacle is then evaluated according to the signal travel time whereof the travelling speed is known. The distance is given by the formula: distance=speed*time/2. The more directional the signal, the better the evaluation of the localization of this signal with respect to the source, in addition to its distance, can be achieved by controlling the source so that it sequentially scans the area to be monitored and by analyzing the reflected signals per transmission slot.

Another type of range-finder operation, mainly used for infrared telemeters, includes evaluating the distance of an obstacle by means of a triangulation method using a lens, generally a Fresnel lens, focusing the feedback signal and sending it on a row of receivers, thus making it possible to know by triangulation the distance of the obstacle having reflected the signal.

Thereafter, the main axis of the range-finder will be called the symmetry axis of the cone whose angle is the most closed wherein is inscribed the signal coming from a range-finder source. It is the axis towards which the range-finder "points".

According to an embodiment with range-finders, the main axes of the range-finders are parallel with the ground if the platform is placed on a flat surface.

According to an alternative embodiment with range-finders, the main axes of the range-finders are directed towards the ground such that the signal coming from the range-finder touches the ground at a predefined distance from the platform. This distance can be, for example, equal to the largest distance at which a foot of a user using the platform can be.

According to an embodiment with range-finders, the platform comprises at least four signal sources arranged such as to send a signal to the areas defined as being facing the four sides of the smallest rectangle wherein the upper surface of the platform is inscribed, at a height equal to the height of said platform. Each of these signal sources is associated with a signal receiver. Such a system can be constituted for example of a certain number of infra red range-finders arranged along the side portion of the platform.

According to another embodiment, the platform is circular, the range-finders being arranged on the periphery of the platform such as to cover the space around it. One of the advantages of this embodiment holds that a circular shape can appear as less directional as to the position of the feet of the user, whereas the small sides of a rectangle shape may be considered as an implicit indication of the spot where the feet should be placed. For balance platform usage, the user will only be guided as to where to place or move his/her feet, by seeking balance. Setting up the device for a gymnastics session is also made easier thanks to the central symmetry of the circular shape, there is no "side" to be placed in a certain position for example with respect to the television screen.

According to an embodiment with range-finders, the platform comprises at least four signal sources arranged such as to send a signal in the areas defined as being facing the four corners of the smallest rectangle wherein upper surface of the platform is inscribed, at a height equal to the height of said platform. Each of these signal sources is associated with a signal receiver.

According to an embodiment with range-finders, the platform comprises one single signal source which is arranged on a rotating system located at the center of the platform and which makes the signal source rotate around itself by a certain number of degrees per time unit. The adequate receiver is located next to the source on the rotating system and turns in unison with the source. The platform further comprises a certain number of apertures between the source and the outside of the platform such that if the source is aligned with one of the apertures and is activated, the emitted signal will be sent to the outside of the platform in a defined area and will be reflected by the same path. The rotating system is such that it positions the source and its receiver sequentially facing each of the apertures and that thus, the source sends a signal and waits for the reflected signal for a time equivalent to a maximum given distance. One single source and one single receiver thus make it possible to cover the entirety of areas outside the platform.

According to an embodiment with range-finders, certain signal sources (and associated receivers) are placed on a rotating system, so that the sources and receivers may cover a more important area than if they were stationary.

According to an embodiment with infrared range-finders, certain signal sources (and associated receivers) are placed behind a lens diffracting the emitted signal and focusing the feedback signal, thus making it possible for said sources to cover a greater area than without the lens. The direction from which the reflected signal is coming from may thus be established by triangulation as described before.

According to an embodiment with range-finders, the device according to the invention could comprise, according to the areas to cover, signal sources with diffracting lens, for example for the sources located on the sides of the rectangle wherein the platform is inscribed, and the sources without diffracting lens, possibly mounted on a rotating system, for example for the sources located at the corners of the rectangle wherein the platform is inscribed, such as to be able to cover the largest possible area with the smallest number of signal sources.

According to an embodiment, the obstacle positioning system may be used to evaluate the angle of inclination of the platform when it is used as balance board. In fact, in this case, when the platform is tilted, the ground will appear to the obstacle positioning system as an obstacle near the side of the platform which is leaning towards the ground, whereas the obstacles on the side of the raised platform will seem far away. The shorter the distance evaluated with the ground considered as an obstacle, the more tilted the platform will be. The equilibrium corresponding to the upper portion of the platform when horizontal is translated, if a calibration of the topology of the obstacles as described before has been undertaken, by the fact that the distances between the platform with respect to the obstacles correspond to those memorized during calibration.

According to a particular embodiment where the range-finder system is used to determine the inclination of the platform when used as a balance board, the main axes of the range-finders will point towards the ground such as to detect as early as possible the distance variations between the side portion of the platform and the ground. According to this embodiment, there could be a "balance board" mode such that when the platform is used as a balance board, the axes of the range-finders are directed towards the ground according to a specific angle determined such as to optimize the evaluation by the range-finders of the platform inclination. According to this embodiment, the addition of gyroscope type angular sensors or accelerometers to the device, as mentioned before, will only be considered in the case where the required level of precision of the angular variations is not accessible to the sole range-finder system.

According to an embodiment with calibration, the obstacle positioning system may be used in order to determine the shape of the foot of the user, pointing facing the platform or sideways, based on a calibration realized at the start of the session. In fact, when the foot of the user points towards the platform, the obstacle that it constitutes is narrower that when it is "sideways" with respect to the platform: this determines two different images for the positioning system and hence the possibility to differentiate between them. The fact of knowing the position of the foot of a user when he/she is carrying out a choreography may be used by the interactive program to control whether the user is correctly doing the choreography or not if the latter indicates the position that should be taken by the foot of the user with respect to the platform.

The device according to embodiments of the invention comprises a connecting system sending the signals coming from the platform sensors to a digital processing unit.

According to a particular embodiment, this connecting system sends to a digital processing unit the signals coming from the set of platform sensors, which are position sensors and, according to the embodiments, pressure sensors, angle sensors etc.

According to a particular embodiment, this connecting system is a wireless system.

According to a particular embodiment, this connecting system associates with each signal, an identifier specific to each platform such as to distinguish the signals coming from each platform and thus make it possible for several platforms to be used simultaneously on a same digital processing unit.

According to particular embodiment, this connecting system is bidirectional, that is to say, that it sends signals coming from the device to the digital processing unit, but also that it transmits signals from the digital processing unit to the device. According to this embodiment, the device according to the invention is provided with actuators that are activated by signals coming from the digital processing unit. They could be for example lights which light up on the device according to the scores achieved or the level of difficulty of the choreographies. Other types of actuators are also to be considered, such as for example feedback of mechanical effect (shaking, vibrations), sound etc.

BRIEF DESCRIPTION OF THE DRAWINGS

Embodiments of the invention will be better understood with the following description, by way of explanation, of an embodiment of the invention, with reference to the accompanying drawings.

DETAILED DESCRIPTION OF THE DRAWINGS

Figure 1:
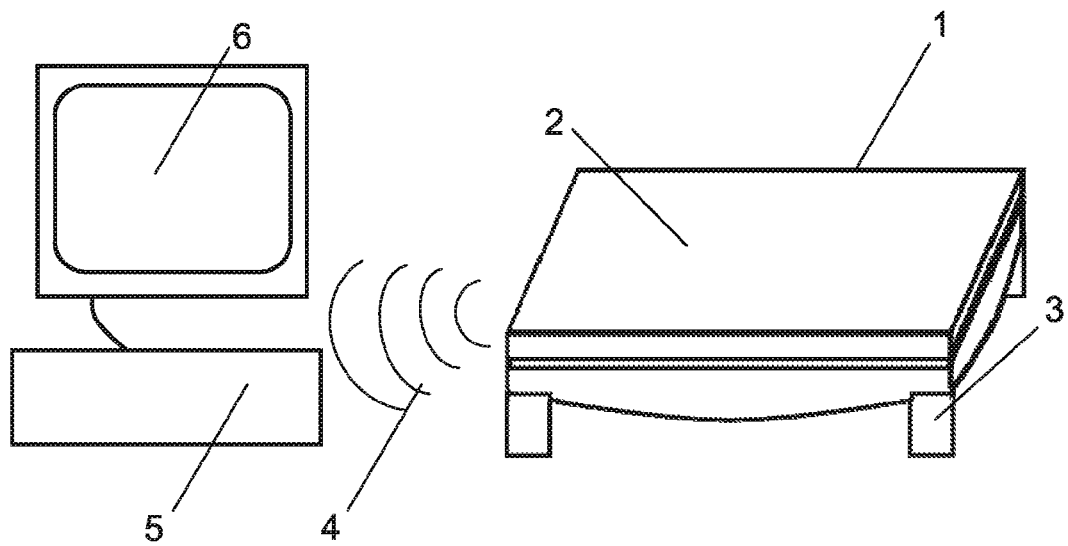
FIG. 1 illustrates an overall view of the device according to an embodiment of the invention, of a digital processing unit and a display screen.

According to an embodiment represented FIG. 1, a device according to an embodiment of the invention is constituted of comprises a platform 1 having a flat upper portion 2 supported by four legs 3. The device is connected by a bidirectional connecting system 4 to a digital processing unit 5 (connected to a display screen 6) to which it transmits the signals coming from the device.

Figure 2:
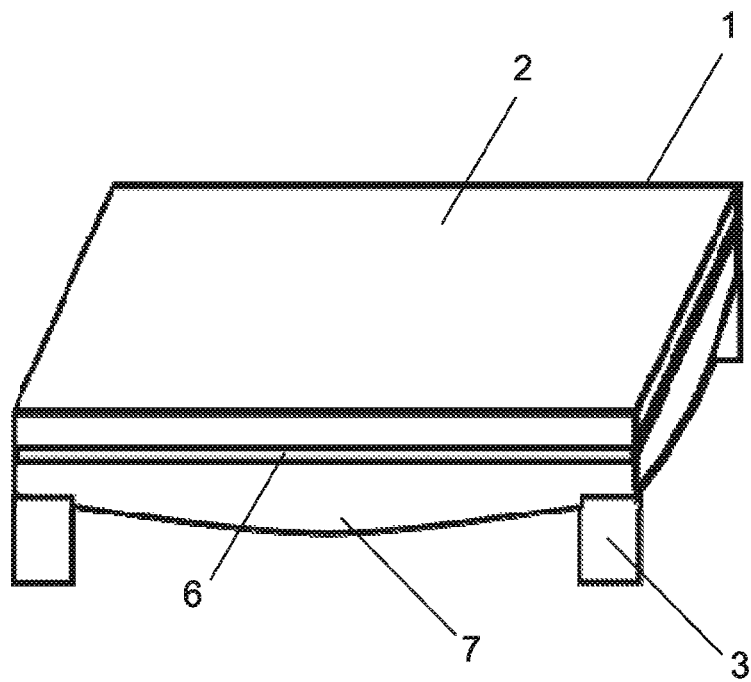
FIG. 2 illustrates a perspective view of the device according to an embodiment of the invention.

FIG. 2 represents the device according to an embodiment of the invention in perspective. The platform 1 can be seen, with a flat upper surface 2, legs 3, on the portion of the platform, a range-finder system 6 and a lower convex surface 7. The flat upper surface 2 comprises, for example, a surface sensitive to the pressure activated when a user weights on the upper portion of the platform.

Figure 3:
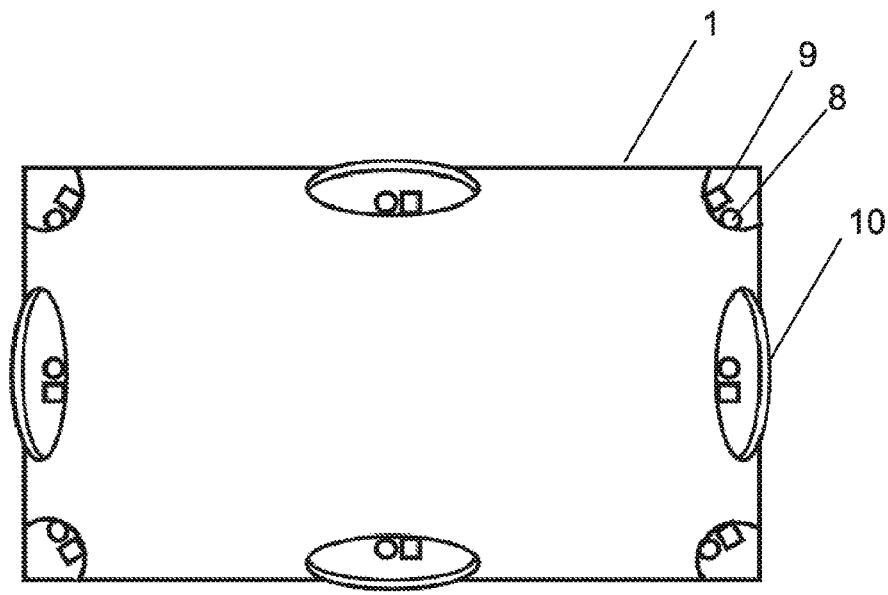
FIG. 3 illustrates a plane cross-sectional view of the upper portion of the platform of the device according to an embodiment of the invention showing the range-finder system.

FIG. 3 illustrates a plane cross-sectional view of the upper portion of the platform of the device according to an embodiment of the invention showing the range-finder system. It can be seen on the four sides and the four corners of the platform 1, the signal sources 8 if the infrared range-finder system as well as the associated receivers 9. The sources located on the sides are associated with a lens 10 which diffracts the emitted signal, thus making it possible for the source to cover a more important area, and focus the feedback signal.

Figure 4:
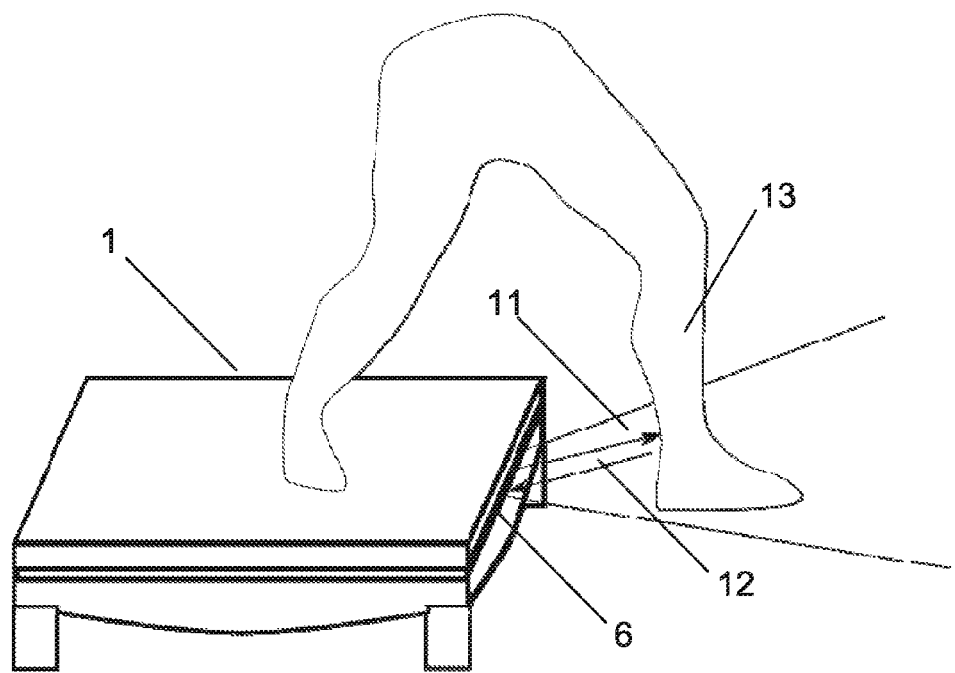
FIG. 4 illustrates a perspective view of the device in use according to an embodiment of the invention, of a user and the range-finder system.

FIG. 4 illustrates the device according to an embodiment of the invention in use, and particularly the positioning of the leg of a user standing on the platform 1 by range-finders by means of the signal emitted 11 by the range-finder system 6 and the signal 12 reflected by the leg 13 of the user, to the range-finder system receiver.

Figure 5A:
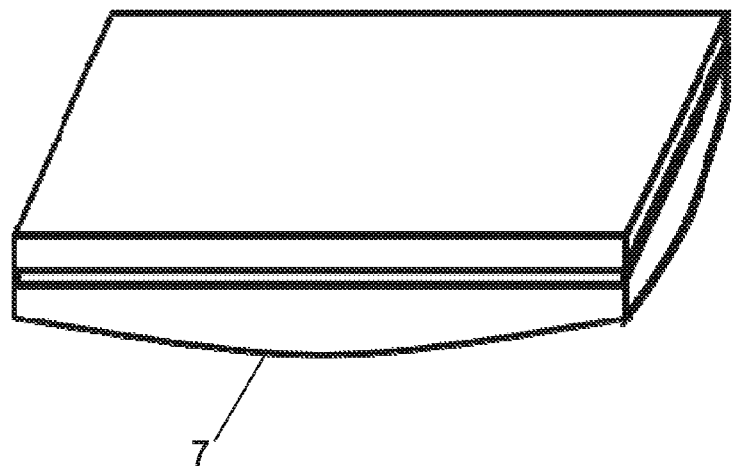
FIG. 5A illustrates a perspective view of the device with the legs removed according to an embodiment of the invention.

FIG. 5A represents the device according to an embodiment of the invention with the legs removed, and its lower convex surface 7 resting on the ground.

Figure 5B:
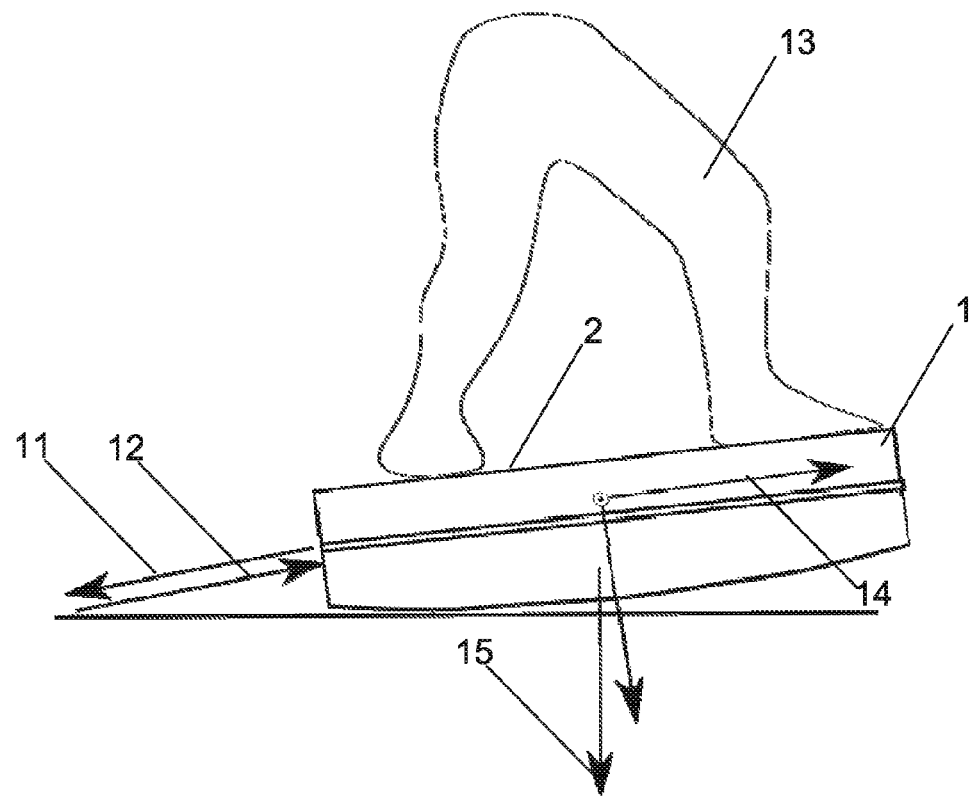
FIG. 5B illustrates a perspective view with user of the device used as a balance board according to an embodiment of the invention.

FIG. 5B represents the device according to an embodiment of the invention without the legs, and with a user—whose legs 13 are represented—on the platform. The inclination of the platform is determined at the same time by the obstacle positioning system that detects, via an emitted 11 and reflected 12 signal, the proximity with the ground, and also by a system of three orthogonal accelerometers, whereof the three axes 14 (including two on the plane of the upper surface 2 of the platform 1) are represented, making it possible to evaluate the relative position of the gravity vector 15 supposed vertical, and hence the inclination of the platform.

According to an embodiment, the signals emitted by the device according to embodiments of the invention will be accompanied by a specific signal making it possible to identify that the emitter of signals is a peripheral device of the same category as the device. Such an identifying signal will make it possible to ensure, in the case of competition or network game systems involving several remote participants that the set of competitors are all provided with a peripheral device of the same type as that of the device according to embodiments of the invention.

According to an embodiment, light-emitting diodes are placed under the upper surface or all along the rim of the platform and indicate to the user, by means of a light signal either the position his/her foot has taken, or, for example in a learning or game framework, the position that it should take. These different features can be managed by means of the image and sound method operating on the digital processing unit to which the device is connected.

The device according to embodiments of the invention can be combined with other interactive accessories that exist for game consoles, and particularly camera type and interactive gamepad accessories. In fact, the device according to embodiments of the invention makes it possible to evaluate the position of the projection of the center of gravity of the user on the upper surface of the platform, be it used as a stable platform or a balance board. This information completes that coming from the peripheral devices of camera and interactive gamepad type establishing a localization of key elements for the user (cutout, position of the hands holding the gamepad . . . ) and makes it possible to evaluate, in combination with the latter and while this is not realizable by any of the indicated peripheral devices on their own, a precise body modelization of the user postures.

Embodiments of the invention described in what precedes by way of example. It is obvious that the skilled person is able to realize the different alternatives of the invention without departing from the scope of the patent.

The invention claimed is:

1. A device for the interactive practice of gymnastics in association with a digital processing unit running a gymnastics program to be followed by a user, the device comprising:
 a platform including a platform body and one or more removable lets, the platform being provided with a sensor system adapted to detect a position of obstacles around said platform when said one or more removable legs are attached to the platform body, said sensor system being a range-finder system; and
 an electrical connecting system operably coupling said sensors of said sensor system to said digital processing unit, wherein the position of said obstacles is provided to said digital processing unit, and
 wherein said platform includes a convex lower portion, and
 wherein said range-finder system is adapted to indicate an inclination of said platform body by evaluating a distance between said platform body and a ground surface when said one or more removable legs are detached from the platform body.

2. The device according to claim 1, wherein said range-finder system comprises ultrasound, infrared or radio range-finders, or a combination thereof.

3. The device according to claim 1, wherein main axes of the said range-finders are located on a plane parallel with the ground.

4. The device according to claim 1, wherein main axes of said range-finders are directed towards the ground surface, at a defined distance from said platform.

5. The device according to claim 1, wherein said range-finders are positioned at four sides of a smallest rectangle inscribed in an upper surface of said platform.

6. The device according to claim 1, wherein said one or more legs comprises pressure sensors on which the platform body presses.

7. The device according to claim 1, wherein pressure sensors located in the platform body press on said one or more legs of said platform.

8. The device according to claim 1, wherein said platform comprises a system of angle sensors, the angle sensors comprising gyroscopes or accelerometers.

9. The device according to claim 1, wherein said electrical connecting system comprises a bidirectional system for connecting said platform and said digital processing unit.

10. The device according to claim 1, wherein signals emitted by said platform and transmitted by said electrical connecting system comprise a specific signal identifying said device emitting said signals.

11. The device according to claim 1, wherein the sensor system comprises a calibration phase that memorizes closest obstacles around said platform.

12. The device according to claim 11, wherein certain range-finders comprise infrared range-finders placed behind lenses diffracting signals which the range-finders emit and focusing feedback signals.

13. The device according to claim 11, wherein said sensor system is used in order to determine the shape of a foot of a user, pointing facing said platform or sideways, based on said calibration phase.

* * * * *